United States Patent [19]

Pincon

[11] Patent Number: 4,599,179
[45] Date of Patent: Jul. 8, 1986

[54] METHOD AND APPARATUS FOR TREATING SEPTIC SYSTEM WITH RADIATION ACTIVATED FLUID

[76] Inventor: Andrew J. Pincon, 1819 W. Grand Ave., Chicago, Ill. 60622

[21] Appl. No.: 512,919

[22] Filed: Jul. 12, 1983

[51] Int. Cl.⁴ .................................................. C02F 1/78
[52] U.S. Cl. ..................................... 210/760; 210/758; 210/748; 210/716; 422/186.3
[58] Field of Search ...................... 204/157.1 P, 158 P; 422/186.3; 210/716, 748, 758, 760, 605

[56]  References Cited

U.S. PATENT DOCUMENTS

| 4,021,338 | 5/1977 | Harkin | 210/759 |
| 4,214,962 | 7/1980 | Pincon | 204/157.1 R |
| 4,220,529 | 9/1980 | Daude-Lagrave | 210/758 |
| 4,351,730 | 9/1982 | Bailey et al. | 210/758 |

FOREIGN PATENT DOCUMENTS

| 1028581 | 3/1978 | Canada . |
| 2307877 | 2/1973 | Fed. Rep. of Germany . |
| 2719638 | 5/1977 | Fed. Rep. of Germany . |

Primary Examiner—Howard S. Williams
Attorney, Agent, or Firm—Marshall, O'Toole, Gerstein, Murray & Bicknell

[57] ABSTRACT

A low cost method and apparatus for maintaining and rejuvenating a septic system in which an activated gaseous fluid formed by irradiating an oxygen containing gas, such as ambient air, with radiation having a wavelength below 200 nanometers produced by a low powered ultra-violet lamp is brought into intimate contact with liquid in the effluent chamber of a septic tank to effect a substantial reduction in the concentration of suspended solids, volatile solids and fecal coliform in the liquid and when the activated fluid is brought into intimate contact with a drainage field of a septic system clogged with water-insoluble sulfides, and polysaccharide gums and anaerobic organisms of the deposits which have clogged the drainage field are removed. The effluent from a septic tank treated with activated fluid after filtering through a sand filter and subjected to a second treatment with the activated fluid produces a discharge of surface quality water.

11 Claims, 2 Drawing Figures

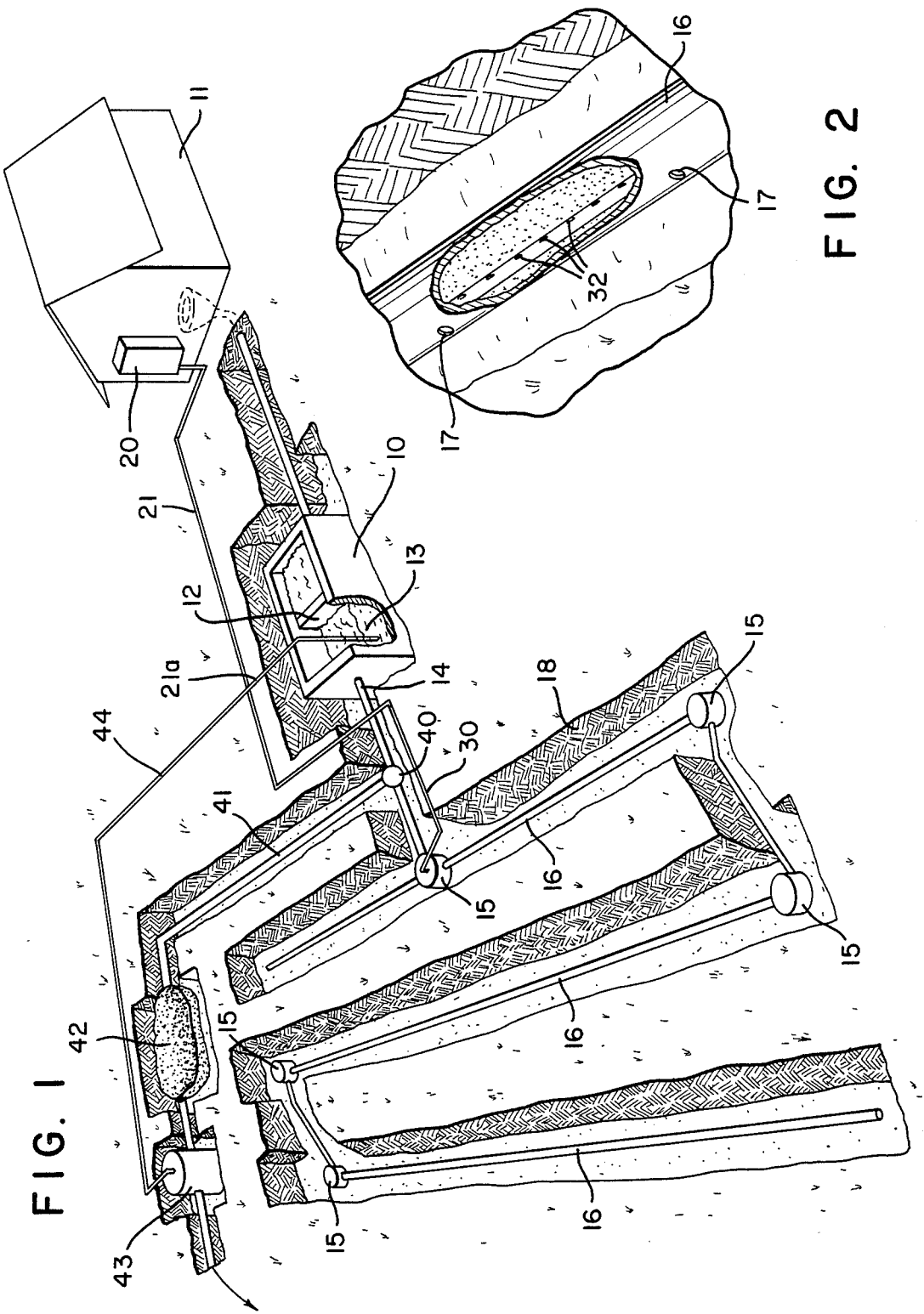

METHOD AND APPARATUS FOR TREATING SEPTIC SYSTEM WITH RADIATION ACTIVATED FLUID

This invention relates generally to the treatment of a septic system and more particularly to a method and system for more efficiently and economically maintaining and prolonging the useful life of a septic system, as well as rejuvenating a clogged septic drainage field.

The most common method of wastewater disposal in areas not served by communal sewage collection and treatment systems currently makes use of septic systems, involving collection and septic treatment of all wastes in a large baffled tank and purifying disposal of the clarified water flowing from the tank by percolation through soil. Regardless of the initial porosity of the soil, many septic systems fail after a few years of use. Failure may be evidenced by surfacing of unpurified effluents, causing nuisance stenches and public health hazards. Alternatively, subsurface ponding of water in the drainage bed or field may cause the tank to overfill, resulting in sluggishness or stoppage of the drains in the buildings being serviced by the septic system.

The reason for system failure is the gradual formation underground of an impermeable clogged or crusted layer in the soil below and surrounding the drainage bed. Flow of water through this clogged or crusted zone is severely restricted or even eliminated and air no longer enters the bed, although the permeability of the surrounding soil remains essentially unchanged. Consequently, huge volumes of stagnant septic tank effluent accumulate in the drainage bed.

In drainage beds when air is no longer drawn into the soil, the range of electron acceptors available to microorganisms in the bed becomes very restricted. There is no dissolved oxygen in the septic tank effluent, since any air in the water has been used up in fermentations in the tank. The only significant electron acceptor available in ponded belts is sulfate (four to ten ppm), and this is rapidly reduced to sulfide.

The bulk of the sulfides combine with ions of heavy or transistion metals (e.g., iron, manganese, nickel, copper, magnesium, zinc, etc.) present in the soil or in the waste-water (approximately five ppm total metal cations in septic tank effluent). This cause deposition of black insoluble inorganic sulfides in the bed. The beds of failed septic systems invariably have intensely black impervious layers underneath and around the gravel. The gravel itself is generally coated with black slime.

The insoluble sulfides contribute greatly to blockage of the soil capillaries, but this is not the only deleterious effect of sulfides. Many elements tied up in insoluble form as sulfides are required by microorganisms for their redox enzymes, the organic catalysts needed for respiratory functions, including degradation of organic matter. Binding of trace elements by sulfides may, therefore, inhibit organisms otherwise capable of destroying organic materials in the drainage bed.

One last contributor to the formation of a clogged zone is the anaerobic bacteria themselves. Many microorganisms, particularly anaerobic bacteria which multiply rapidly after the sulfide deposits prevent air from entering the bed, product polysaccharide slimes or gums, which they secrete into their surroundings. These seem to function as a protective sheath around the bacterial cell wall. When formed in situ in the drainage field or bed, such polysaccharides help to form an impermeable layer in the bacterial zone. Organic matter obtained from clogged layers of ponded beds, contain a substantial percentage of polysaccharides, and this percentage increases with the age of the clogged layers. The net result of the deposition of insoluble sulfides and other metabolites is an anaerobic zone or layer of clogging in the soil which will not allow water to seep away at a tolerable rate. The dense anaerobic layer becomes very hard and brittle, assuming the character of a crust in the soil. Since the sulfides formed in drainage beds play such a cardinal role in the formation and maintenance of the crust, it is imperative that their formation be prevented and, if present, removed to restore percolation to the bed.

The deposition of water-insoluble sulfides can be avoided and sulfide deposits solubilized by a variety of treatments, such as contacting with an oxidizing agent. However, many of these are not useful because of the effect they have on the environmental and microbiomass. For example, although sulfides can be oxidized relatively inexpensively by chlorine or oxychlorides (e.g., hypochlorites), these reagents would cause sterilization of the bed, destroying the aerobic microorganisms needed to subsequenlty decompose the organics in the clogged/crusted drainage zones. Moreover, chlorinating reagents would also produce in the septic system carcinogens, such as trichloromethane and toxic chloramines from the ammonia and amino compounds present in the septic tank and drainage field. It would be unwise to risk forming carcinogenic compounds which would diffuse into the groundwater. Other conventional oxidants, such as permanganate or dichromate, are too expensive and act only under acidic or special conditions. Ozone also converts sulfide into soluble sulfate but does not remove polysaccharide gums and have other objectionable features which mitigate against their use. Others have tried aerobic treatment by adding ozone to the septic system but such treatment is expensive and fails to accomplish the desired results. And, drainage beds have been treated in situ with air and hydrogen peroxide without complete success. Furthermore, it is hazardous to use the highly concentrated solutions of hydrogen peroxide required and clogged drainage fields have been known to explode when being treated with hydrogen peroxide.

It is therefore an object of the present invention to provide a method and apparatus for more efficiently and economically maintaining septic system and rejuvenate a septic drainage field which has become clogged by deposits of water-insoluble metal sulfides and polysaccharide gums.

A further object of the present invention is to provide a method and apparatus for maintaining a septic system in an aerobic state with a minimal amount of water-insoluble metal sulfides and objectionable polysaccharide gums normally associated with a septic system.

The present invention will be apparent from the following description and claims when read in conjunction with the accompanying drawing showing a diagrammatic perspective view of a septic system embodying the system of the present invention for treating the effluent in an effluent chamber of a septic tank and drainage field with electromagnetically activated fluid and for producing surface water quality effluent without requiring treatment of effluent from a septic tank with chlorine.

FIG. 1 is a schematic perspective view partially in section showing a septic system illustrating the present invention; and FIG. 2 is a fragmentary enlarged perspective view partially in section of conduit means used in the present invention.

The foregoing objects and other advantages inherent in the present invention are achieved by contacting a septic system with an activated fluid produced by radiating a gaseous stream containing oxygen and water vapor with electromagnetic radiation predominantly below a wave-length of 200 nanometers, and preferably having a wave-length between 100 and 200 nanometers. By periodic or continuous aeration of the septic tank and/or the drainage field thereof with an activated fluid as hereinafter characterized, the water-insoluble sulfide producing agents and the biodegradable material in the effluent from a septic tank in the liquid going to the drainage field will be significantly reduced (up to 90%), total Kjeldahl nitrogen and $NH_3$ are oxidized to nitrate, surface tension of the effluent will be reduced and thereby enhancing percolation of water through the soil, large weight molecular fragments, such as oils, fats, grease and proteins, will be broken down to smaller weight fragments so soil bearing microbes will have an easier time furthering the digesting biodegradable material in the effluent, the anaerobic microbial biomass in the effluent chamber of the septic tank is reduced significantly or eliminated leaving only the desirable bacteria, further reducing the danger of the drainage field clogging.

In applicant's U.S. Pat. No. 4,214,962 a method and apparatus are disclosed for producing the so-called activated oxygen comprising the activated fluid used to treat the septic system in the present invention and in which a source gaseous oxygen, such as ambient air passed through an enclosure housing a source of electromagnetic radiation within the ultra-violet range having a wave-length predominantly below 200 nanometers and preferably between about 100 and 200 nanometers (nm) to effect exciting, ionizing and/or dissassociating the oxygen in the presence of water (e.g. water vapor in the air) without affecting the nitrogen in the air. It has been determined that the so-called activated oxygen and the activated fluid used in the present invention contains hydroxyl ions (OH), atomic oxygen ($O_1$), perhydroxyl ($HO_2$), hydrogen peroxide ($H_2O_2$), ozone ($O_3$) and molecular oxygen ($O_2$) and is characterized by the properties disclosed herein and in U.S. Pat. No. 4,214,962 which incorporated by reference.

Initially the activated fluid discharged from the enclosure containing the specified ultra-violet radiation was thought to be ozone. However, further testing in addition to the differences enumerated in U.S. Pat. No. 4,214,962 showed that while the gas stream contained some ozone, there were significant differences, as shown in the following Table I:

TABLE I

| OZONE | ACTIVATED FLUID |
|---|---|
| 1. Solutions in sulfuric acid | 1. Solutions in sulfuric acid |
| a. ph 1.0 absorbs at 254 nm | a. ph 1.0 no absorbence at 254 nm |
| b. ph 4.0 absorbs at 254 nm | b. ph 4,0 no absorbence at 254 nm |
| c. No carbon in generator to contribute to $CO_2$ | c. ph 1.0 and 4.0 both show $co_2$ in solution |
| d. ph 1.5 no chemiluminescence at 190 nm | d. ph 1.5 strong chemiluminescence at 190 nm |
| 2. Absorbs light strongly at 254 nm in gaseous phase | 2. Absorbs light weakly at 254 nm in gaseous phase |

TABLE I-continued

| OZONE | ACTIVATED FLUID |
|---|---|
| 3. Produces $Mn^{+4}$ at pH 6.5 | 3. Produces $Mn^{+7}$ at pH 6.5 |
| 4. Produces $Mn^{+7}$ at pH 2.0 | 4. Produces $Mn^{+4}$ at pH 2.0 |
| 5. No observations | 5. Oxidises 20 mg/l resorcinol to $CO^2$ and $H_2O$ at ph 6.4 |
| 6. Increases surface tension of distilled water by 4 dynes $cm^2$ | 6. Reduces surface tension of distilled water by about 20 dynes $cm^2$ |

A typical septic system as shown in the drawing is comprised of a baffled septic tank 10 which receives sewage and waste water in an upstream section thereof from a dwelling or establishment 11. The downstream section or effluent chamber 12 of the septic tank 10 is adapted to receive from the upstream section essentially liquid containing small amounts of suspended solids and soluble matter. The effluent from the septic tank 10 normally flows below the surface of the ground through a conduit 14 into a first drop box 15 from which extend several lengths of drainage tiles 16 connected in series or radiating from a single drop box 15 with each tile 16 having weep holes 17 at spaced points along their length to permit effluent to percolate into the soil 18.

In treating a septic system in accordance with one preferred embodiment of the present invention, activated fluid is formed by passing a stream of ambient air through a radiation unit 20 as disclosed in U.S. Pat. No. 4,214,962 and is introduced continuously or semi-continuously through a conduit 21, 21a into the effluent chamber 12 of the septic tank 10 at a point adjacent the lower wall of the chamber 12 so as to intimately contact the effluent with the activated fluid before the effluent is discharged from the chamber 12. The effluent from chamber 12 is thereafter conveyed below ground level through conduit 14 into the first drop box 15 from which extend several interconnected drainage tiles 16 connected in series or, if desired, several tiles can radiate outwardly from a single drop box 15 with each tile having weep holes 17 at spaced points along the length thereof to permit effluent to escape and percolate into the ground.

The radiation unit is described in U.S. Pat. No. 4,214,962 and in addition to a radiation chamber having a source of radiation of a wave-length predominantly below 200 nm contains an activated fluid pump and a timer for the pump which are not shown. A typical installation will supply 12 liter of activated fluid per minute to a septic tank receiving about 1000 liters of waste per day normally produced by a family of 4 people. The activated fluid is preferably supplied to the effluent or second chamber of the septic tank for 45 minutes each hour with a 15 minute rest period for the unit 20 in between. The activated fluid from the unit 20 is preferably discharged into the effluent chamber 12 of the septic tank 10 via a fine bubble diffuser 13, such as the AIR-AQUA System manufactured by The Hinde Engineering Company of Highland Park, Ill., USA, which releases a stream of fine bubbles varying in size from about 1/64 inch to about ⅛ inch and which does not create eddy currents in the chamber.

The radiologically activated fluid which is supplied to a septic tank at a rate of about 12 liters per minute can be provided by passing ambient air through a 4 inch diameter cylindrical chamber having a 53 watt ultra-violet emitting lamp 32.5 inches long mounted axially in the chamber. The lamp can have an envelope of ultra pure silica filled with an argon-mercury-deuterium gaseous mixture which produces radiation having a wavelength of about 160 nanometers (nm), although other materials which produce a similar radiation can also be used.

When a typical septic system installation which processes about 1000 gallons waste per day became clogged and surface water accumulated on the lawn, an analysis of the system before treatment with activated fluid gave the following results:

|  | Septic Water in Effluent Chamber | Septic Water on Lawn |
| --- | --- | --- |
| pH | 7.1 | 7.6 |
| BOD (1) | 685 | 1,160 |
| Susp. Solids | 3140 | 141,100 |
| Volatile Solids (2) | 2280 | 14,180 |
| Fecal Coliform | 100,00/100 ml | 300,00/100 ml |

(1) Biological Oxygen Demand
(2) Combustible Solids

After treatment of the effluent in the effluent chamber 12 of the above septic tank with 12 liters of activated fluid as described herein for 45 minutes each hour for 22 days, the lawn was completely dry and analysis of the effluent in the effluent chamber of the septic tank gave the following results:

| pH | 7.9 |
| --- | --- |
| BOD | 20 |
| Suspended Solid | 32 |

(Analysis for volatile Solids and Fecal Coliform not yet completed).

In a modified form of the above described septic system which enables the useful life of the septic system, and particularly the drainage field to be substantially prolonged, the fine bubble diffuser 13 in the effluent chamber 12 for introducing activated fluid is disposed in the effluent chamber 12 a short distance (i.e. about six inches) above the bottom of the effluent chamber so that a significantly larger amount of the suspended solids and volatile solids in the effluent chamber settle out of the effluent before the effluent enters the drainage field, because the solids are not agitated by the bubbles of activated fluid entering the effluent chamber. To further increase the settling rate of the suspended solids in the effluent chamber, the discharge of activated fluid into the effluent chamber 12 can be terminated for a period up to two hours each day preferably at a time when waste is not being added to the septic system.

In a further embodiment of the present invention illustrated in the accompanying drawing the drainage field is treated with activated fluid from the radiation unit 20. Thus, a conduit 30 conveys activated fluid from the ultra-violet radiation unit 20 via conduits 21 and 30 into the first drop box 15 where the conduit 30 connects with a fine bubble diffuser tube 31 extending the length of the drain tile 16. As illustrated in the enlarged fragmentary view in the drawing, the diffuser tube 31 which preferably is flexible, is maintained in position at the bottom of the drain tile 16 and is provided at spaced points although the length with check valves 32 through which fine bubbles of activated fluid are discharged. If desired, each length of drain tile 16 in the field extending between the several drop boxes 15 can be provided with a fine bubble diffuser tube 31. Treatment of the drainage field in the above manner significantly improves the condition of the field, prolongs the life of the field and can be used to recondition a clogged field.

Where it is desired or required to provide an activated fluid having a higher concentration of active forms of oxygen and hydrogen for on-site use at; locations such as restaurants, motels and service stations, without the necessity of providing bottled oxygen for processing in a radiation chamber as described in U.S. Pat. No. 4,214,962, it is possible to provide a gaseous fluid having a concentration of oxygen substantially greater than 20 percent by passing air through a molecular sieve which removes nitrogen from the air to provide a gas composed largely of oxygen. One such molecular sieve is a Briox Oxy-Concentrator which provides a stream of gas containing between 60% and 90% oxygen. The concentrated oxygen from the molecular sieve can be passed directly through the radiation unit 20.

As further evidence of the unusual ability of the activated fluid treatment of the present invention to reduce the Biological Oxygen Demand (BOD), Suspended Solids, Volatile Solids and Fecal Coliform count in the effluent chamber of a septic system when supplied at a low level in accordance with the present invention, an alternate method and system of processing the effluent from the septic tank 10 (i.e. other than by percolation in a drainage field) is shown in the upper portion of the accompanying drawing. Thus, the effluent from effluent chamber 12 of the septic tank 10 enters a junction box 40 through conduit 13 and is diverted by suitable valve means (not shown) via conduit 41 through a conventional sand filter 42 into a treating tank 43. The tank 43 is provided with a supply of radiologically activated fluid from the activating chamber 20 via conduits 21 and 44 having valve means therein (not shown). The activated fluid is discharged into the filtered effluent in the treating tank 43 by means of a fine bubble dispenser (not shown) of the type used in chamber 12 which is mounted adjacent the lower wall of the tank 43. The filtered effluent is preferably treated with the activated fluid for about 45 minutes each hour. The discharge from the tank 43 can flow directly into a stream or river, as the discharge meets all standards for surface quality water. It will be evident that the latter method in addition to being a much less expensive means of treating the effluent from a septic tank than by an activated sludge installation (normally required where a drainage field can not be used), avoids a chlorination treatment which has many objectionable features.

It will be further apparent to those skilled in the art that the more effective low level, continuous or semi-continuous treatment of effluent in a septic system with radiation activated fluid is particulary important where water conservation is practiced in connection with a septic system, since the objectionable components in the effluent are concentrated between about two and ten times in veiw of the smaller volume of liquid present in the system. It is increasingly important, therefore, to be able to effectively reduce to acceptable levels in an economical manner the BOD, Suspended Solids, Volatile Solids and Fecal Coliform count of the effluent from a waste treatment system, such as a septic-system. And, by removing from the effluent a larger proportion of the objectionable components from the effluent and reducing the size of the larger molecules, such as fat, grease, and proteins, the effluent can be processed more efficiently by the micro-organisms in the drainage field or by secondary or tertiary treatment plants.

I claim:

1. In a method of on-site treatment of septic tank waste liquid containing suspended solids, dissolved metal salts, organic matter, and micro-organisms for prolonging the useful life of an aqueous septic system including a septic tank having a spaced subsurface discharge area for liquid from said septic tank with conduit means for conveying said liquid from said tank to said discharge area, the improvement comprising: feeding substantially continuously into said liquid in said septic tank after a reduction in the concentration of suspended solids therein a fine dispersion of a radiation activated gaseous fluid in an amount which reacts with suspended solids, dissolved metal salts and organic matter in said liquid and which is conveyed by said liquid into said discharge area where said fluid reacts with solids formed in said discharge area including insoluble sulfides and organic deposits which impede the permeability of said subsurface discharge area to liquid conveyed thereto from said septic tank, said radiation activated gaseous fluid produced by irradiating a gas containing oxygen and moisture with electromagnetic radiation predominantly below a wave-length of 200 nanometers; and said gaseous fluid characterized by:
   (1) a solution thereof is sulfuric acid at pH 1.5 exhibiting chemilluminesence at 190 nanometers;
   (2) absorbing light weakly at 254 nanometers in the gaseous phase;
   (3) oxidizing 20 mg/l resorcinol to $CO_2$ and $H_2O$ at pH 6.4;
   (4) reducing surface tension of distilled water by about 20 dynes $cm^2$;
   (5) having an ultraviolet spectrum when measured following irradiation in a polyvinyl chloride enclosure and subsequent dissolving of the product in sulfuric acid at a pH of 1.5 which includes emission in a frequency range including 200 nanometers; and
   (6) having an ultraviolet spectrum when measured following irradiation in a polyvinyl chloride enclosure and subsequent dissolving of the product in phosphoric acid at a pH of 1.5 which includes absorption at 195 nanometers and at 254 nanometers;
whereby said discharge area remains permeable to liquid from said septic tank for a prolonged period.

2. A method as in claim 1, wherein said gas is irradiated with radiation having a wave-length about 160 nanometers.

3. A method as in claim 1, wherein said activated gaseous fluid is brought into intimate contact with said liquid in an effluent chamber within said septic tank as a dispersion of fine bubbles.

4. A method as in claim 3, wherein said activated gaseous fluid is discharged into said effluent chamber at a level substantially above the lower wall of said chamber.

5. A method as in claim 4, wherein the discharge of said gaseous fluid into said effluent chamber is interrupted periodically to permit suspended solids to settle out of said liquid and collect at the bottom of said chamber.

6. A method as in claim 1, wherein said activated gaseous fluid is conveyed through said conduit means into said subsurface discharge area in an amount sufficient to disperse water insoluble metal sulfides and polysaccharide gums in said discharge area.

7. A method as in claim 6, wherein said radiation activated gaseous fluid is brought into intimate contact with said liquid within said conduit means and discharged into said discharge area dispersed in said liquid as a dispersion of fine bubbles; whereby deposits of polysaccharide gums and water-insoluble sulfide in said discharge area are solubilized.

8. A method as in claim 1, wherein said liquid flowing from said septic tank is filtered through a filter means which removes suspended solids therein, and thereafter the filtered liquid is subjected to a second treatment with a sufficient amount of said activated gaseous fluid in a treating chamber to provide surface quality water before being discharged into said drainage area.

9. Apparatus for on-site treatment of an aqueous septic system which prolongs the useful life of the system comprising in combination; a source of radiation activated gaseous fluid, a septic tank with an effluent chamber containing liquid having a reduced concentration of suspended solids, liquid conduit means for conveying said liquid from said chamber to subsurface discharge area, and gas conduit means for bringing said activated gaseous fluid from said source into intimate contact with said liquid in said effluent chamber, and said radiation activated gaseous fluid characterized by;
   (1) a solution thereof in sulfuric acid at pH 1.5 exhibiting chemilluminesence at 190 nanometers;
   (2) absorbing light weakly at 254 nanometers in the gaseous phase;
   (3) oxidizing 20 mg/l resorcinol to $CO_2$ and $H_2O$ at pH 6.4;
   (4) reducing surface tension of distilled water by about 20 dynes $cm^2$;
   (5) having an ultraviolet spectrum when measured following irradiation in a polyvinyl chloride enclosure and subsequent dissolving of the product in sulfuric acid at a pH of 1.5 which includes emission in a frequency range including 200 nanometers; and
   (6) having an ultraviolet spectrum when measured following irradiation in a polyvinyl chloride enclosure and subsequent dissolving of the product in phosphoric acid at a pH of 1.5 which includes absorption at 195 nanometers and at 254 nanometers.

10. Apparatus as in claim 9, wherein said liquid conduit means conveys said liquid from said effluent chamber to a discharge area which is below ground level, and said gas conduit means disposed within said liquid conduit means in said discharge area adapted to discharge into said liquid therein said radiation activated gaseous fluid in finely divided form.

11. Apparatus as in claim 9, wherein liquid conduit means is provided for conveying said liquid from said effluent chamber to a filter means, a filter means which removes suspended solids in said liquid, means for conveying the filtered liquid to a treating chamber, and gas conduit means adapted to feed said radiation activated gaseous fluid in finely divided form into said liquid in said treating chamber.

* * * * *